US010855642B2

(12) United States Patent
Morgese

(10) Patent No.: US 10,855,642 B2
(45) Date of Patent: Dec. 1, 2020

(54) ASYNCHRONOUS MESSAGING AND COMMUNICATION IN A SOCIAL NETWORKING SYSTEM

(71) Applicant: Leavemark, Inc.

(72) Inventor: Jason Morgese, Cape Elizabeth, ME (US)

(73) Assignee: Leavemark, Inc., Portland, ME (US)

( * ) Notice: Subject to any disclaimer, the term of this patent is extended or adjusted under 35 U.S.C. 154(b) by 0 days.

(21) Appl. No.: 16/672,431

(22) Filed: Nov. 1, 2019

(65) Prior Publication Data

US 2020/0195601 A1    Jun. 18, 2020

Related U.S. Application Data

(60) Provisional application No. 62/781,583, filed on Dec. 18, 2018.

(51) Int. Cl.
*H04L 12/58* (2006.01)
*H04L 29/08* (2006.01)
*G06F 9/54* (2006.01)

(52) U.S. Cl.
CPC ............... *H04L 51/32* (2013.01); *G06F 9/54* (2013.01); *H04L 51/18* (2013.01); *H04L 67/325* (2013.01); *H04L 67/327* (2013.01); *H04L 51/24* (2013.01)

(58) Field of Classification Search
CPC ......... H04L 51/32; H04L 51/18; H04L 51/24; G06F 9/54; G06F 2209/545; G06F 9/546; G06F 9/542
See application file for complete search history.

(56) References Cited

U.S. PATENT DOCUMENTS

| | | | |
|---|---|---|---|
| 2015/0156150 A1* | 6/2015 | Bartkiewicz | G06F 3/048 715/752 |
| 2015/0215190 A1* | 7/2015 | Caden | G06Q 50/00 709/224 |
| 2015/0381542 A1* | 12/2015 | Coleman | H04L 51/18 709/206 |
| 2018/0176160 A1* | 6/2018 | Steller | H04L 67/306 |

* cited by examiner

*Primary Examiner* — Shirley X Zhang
(74) *Attorney, Agent, or Firm* — Shah IP Law, PLLC

(57) ABSTRACT

The present disclosure is for systems and methods for asynchronous communication within a social networking system. Specifically, the present invention is for receiving capsuled data that is directed to a recipient. The capsuled data may be partially viewable by a recipient within the social networking system, but may not become fully viewable until a trigger condition is met. The systems and methods disclosed herein enable a determination of whether a trigger condition is met, and, if it is met, the capsuled data may be fully viewable by a recipient.

19 Claims, 8 Drawing Sheets

ASYNCHRONOUS MESSAGING AND COMMUNICATION IN A SOCIAL NETWORKING SYSTEM

CROSS-REFERENCE TO RELATED APPLICATIONS

This application claims priority to U.S. Provisional Patent Application Ser. No. 62/781,583, filed Dec. 18, 2018 entitled "Systems and Methods for a Resilient Messaging Infrastructure for Asynchronous Messaging and Consumption." The entire content of that application is incorporated herein by reference.

BACKGROUND

Field of the Art

This disclosure relates to systems and methods for asynchronous messaging within a social networking system. More particularly, the present invention relates to a resilient messaging infrastructure that enables asynchronous messaging and consumption of digital data within a social networking system.

Discussion of the State of the Art

Current systems and method for sharing digital data is generally synchronous. For example, users who wish to share digital data typically share the data via email messages, text messages, or social media messages and the like. The receiving parties may thereafter consume the digital data upon receipt or at their convenience.

These digital media communications are enabled over client-server communication infrastructure, wherein users access messaging clients (such as email clients, browsers, instant messaging clients, short message service (SMS) clients, or social networking systems) on a client device to create and send a message to intended recipients. The messaging client sends the message to a message server associated with the messaging client (e.g., an email server, a web server, an instant messaging server, a short message service center (SMSC), respectively). The message server in turn sends the message to a similar messaging client on a client device of the intended recipient.

The messaging servers that route digital media messages from one user to another are not resilient. For example, current messaging servers are designed to route a large volume of data in accordance to various speed and deliverability criteria. However, messaging servers are not enabled to store digital data over large periods of time because the additional storage and querying associated with storing data would significantly slow down the speed of message transmission. Indeed, messages are generally stored on a first-in, first-out mode and deleted upon transmission to free up memory for routing new data packets. Tasking messaging servers with holding and conditionally releasing digital data requires a significant overhaul of the existing system, which would add significant additional costs and potentially slow down the message transmission speeds. As a result, messaging servers simply cannot handle additional layers of conditionals, heuristics, or resiliency required to transmit data further into the future without significantly compromising messaging speed, accuracy, and delivery costs.

SUMMARY

The present invention overcomes many of the technical and process difficulties typically associated with asynchronous and resilient data transmission and consumption in high-throughput and high-volume messaging systems. Specifically, the present invention introduces an intermediary server for storing data and releasing data upon pre-set or continually evolving variables.

In one embodiment, the present invention permits a user to select digital data that will be disseminated to pre-selected recipients if and when certain conditional criteria are met. In such an embodiment, the user selected digital data may be stored in an intermediary server that also queries other data sources to determine if the user selected conditional criteria are met. If those criteria are met, then the selected digital data is transmitted to the one or more recipients via a messaging server and an end user application.

In one embodiment of the invention, the intermediary server may also be comprised of an authentication system to verify or re-write data transmission rules for delivering digital data to a user. For example, the authentication system may re-write digital data packet header information or payload information to ensure that the recipient, who may have changed his or her reception address—actually receives the digital data. In another embodiment, the authentication system may query a different set of databases than the ones queried by the intermediary server to ensure that the conditional criteria set forth by the user is actually met.

As such, the inventive system unconventionally introduces an intermediary server and additional complexity in the digital messaging ecosystems. This introduction is generally undesired because it adds significant additional complexity, errors, and time delay to the process of delivering digital data payload over a More specifically, the present invention is for a computer program product for delivering and displaying capsuled digital data, wherein the computer program product comprises a non-transitory computer readable storage medium having instructions encoded thereon that, when executed by a processor, cause the processor to receive capsuled digital data, the capsuled digital data comprising recipient information, release agent information, digital data to display to a recipient, and trigger event information for digitally releasing the media to a recipient, the trigger event information comprising a trigger event that must be met in order to release the capsuled digital data to the recipient, generate a partially viewable version of the capsuled digital data responsive to sender preferences, notify the recipient that a capsuled message has been created for the recipient, the notification comprising trigger event information associated with the capsuled message, provide, in a graphical user interface, the partially viewable version of the capsuled digital data that was generated, the partially viewable data being available to the recipient until a trigger event is met, determine whether the trigger event is met and/or whether the trigger event is closer to being met, provide an updated partially viewable version of the capsuled digital data if the trigger event is closer to being met, and provide the capsuled digital data to the recipient if the trigger event is met.

In another embodiment, the present invention is for a computer-implemented method for delivering and displaying capsuled digital data, wherein the computer-implemented method comprises receiving capsuled digital data, the capsuled digital data comprising recipient information, release agent information, digital data to display to a recipient, and trigger event information for digitally releasing the media to a recipient, the trigger event information comprising a trigger event that must be met in order to release the capsuled digital data to the recipient, generating a partially viewable version of the capsuled digital data responsive to sender preferences, notifying the recipient that a capsuled message has been created for the recipient, the notification comprising trigger event information associated with the capsuled message, providing, in a graphical user interface, the partially viewable version of the capsuled digital data that was generated, the partially viewable data being available to the recipient until a trigger event is met, determining whether the trigger event is met and/or whether the trigger event is closer to being met, providing an updated partially viewable version of the capsuled digital data if the trigger event is closer to being met, and providing the capsuled digital data to the recipient if the trigger event is met.

In one embodiment, the capsuled digital data may be generated by a sender within a social networking system. The recipient information may be comprised of identifying a recipient within the social networking system and the release agent information may be comprised of identifying a release agent within the social networking system. In one embodiment, the capsuled digital data is comprised of text data, image data, and/or video data. In one embodiment, the capsuled digital may be comprised of digital files, including, but not limited to text/document files, image files, video files, audio files, picture files, etc.

In one embodiment of the invention, the trigger event information may be comprised of a calendar based trigger, an event based trigger, a conditions based trigger, a location based trigger and/or a release agent based trigger.

In one embodiment, the calendar based trigger is comprised of a date at which the capsuled digital data is released. In another embodiment, the calendar based trigger may also be comprised of a time at which the capsuled digital data is released.

The event based trigger may be comprised of an event, wherein the occurrence of the event causes the capsuled digital data to be released. In one embodiment, the occurrence of a trigger event is detected by querying a truth source. In one embodiment, the occurrence of a trigger event is detected by using an application programming interface.

In one embodiment, the occurrence of a location based trigger is detected by obtaining location data from a computing device used by the recipient of the capsuled data, and the capsuled digital data is released if the recipient is at or near a location that is provided by the location based release trigger.

In one embodiment, the release agent based trigger enables a release agent to release capsuled data posthumously after the death of the sender. The release agent trigger may be comprised of release agent identity information, wherein the release agent identity may be comprised of at least one release agent who is a user within the social networking system and capable of initiating a release sequence. The release agent trigger may be implemented, in one embodiment of the invention, by receiving a release authorization from at least one release agent, notifying the sender that a release authorization has been received from at least one release agent, the notification comprising a cancellation election within a graphical user interface enabling the sender to cancel the release of capsuled digital data, contacting the sender through a communications means outside of the social networking system if the sender has requested additional contact attempts, the contact enabling the sender to provide a cancellation election to cancel the release of capsuled digital data, and sending the capsuled digital data to the intended recipient if a cancellation election is not received from the sender within a pre-determined period of time.

BRIEF DESCRIPTION OF THE DRAWING FIGURES

The accompanying drawings illustrate several embodiments and, together with the description, serve to explain the principles of the invention according to the embodiments. It will be appreciated by one skilled in the art that the particular arrangements illustrated in the drawings are merely exemplary and are not to be considered as limiting of the scope of the invention or the claims herein in any way.

DETAILED DESCRIPTION

Figure 1:
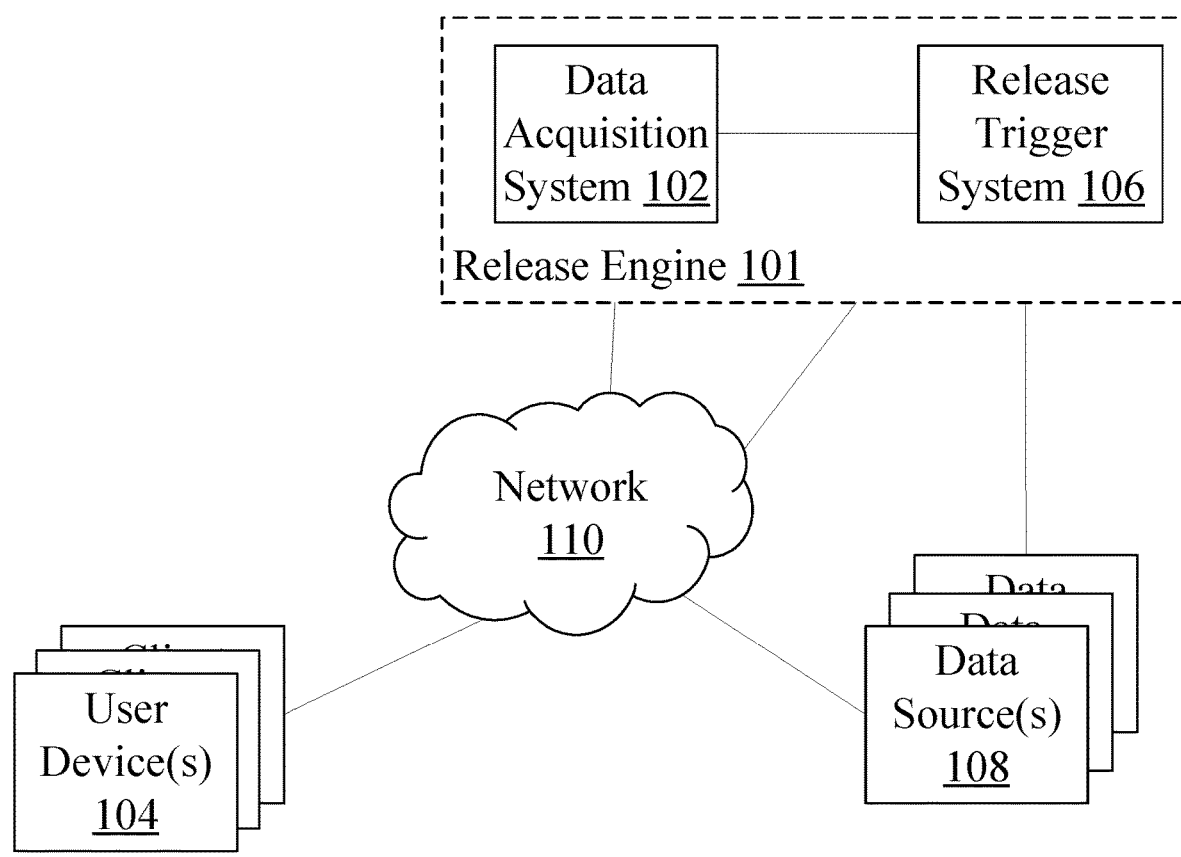
FIG. 1 is a block diagram of an exemplary operating environment for a delayed delivery system, in accordance with an embodiment of the invention.

The inventive system and method (hereinafter sometimes referred to more simply as "system" or "method") described herein significantly reduces the computing resources, computing time, and costs associated with making predictions in a deployed machine learning system, regardless of whether the predictions are made using a deployed system or a cloud scoring API. Specifically, the inventive system stores certain predictions once they are made, processes the stored data, and uses stored predictions if newly requested predictions meet certain similarity criteria associated with the stored predictions. The inventive system described herein reduces the computing resources, computing time, and costs associated with making predictions in a dedicated, or shared/rented machine learning system environment.

One or more different embodiments may be described in the present application. Further, for one or more of the embodiments described herein, numerous alternative arrangements may be described; it should be appreciated that these are presented for illustrative purposes only and are not limiting of the embodiments contained herein or the claims presented herein in any way. One or more of the arrangements may be widely applicable to numerous embodiments, as may be readily apparent from the disclosure. In general, arrangements are described in sufficient detail to enable those skilled in the art to practice one or more of the embodiments, and it should be appreciated that other arrangements may be utilized and that structural, logical, software, electrical and other changes may be made without departing from the scope of the embodiments. Particular features of one or more of the embodiments described herein may be described with reference to one or more particular embodiments or figures that form a part of the present disclosure, and in which are shown, by way of illustration, specific arrangements of one or more of the aspects. It should be appreciated, however, that such features are not limited to usage in the one or more particular embodiments or figures with reference to which they are described. The present disclosure is neither a literal description of all arrangements of one or more of the embodiments nor a listing of features of one or more of the embodiments that must be present in all arrangements.

Headings of sections provided in this patent application and the title of this patent application are for convenience only and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible embodiments and in order to more fully illustrate one or more embodiments. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the embodiments, and does not imply that the illustrated process is preferred. Also, steps are generally described once per aspect, but this does not mean they must occur once, or that they may only occur once each time a process, method, or algorithm is carried out or executed. Some steps may be omitted in some embodiments or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other embodiments need not include the device itself.

Techniques and mechanisms described or referenced herein will sometimes be described in singular form for clarity. However, it should be appreciated that particular embodiments may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various embodiments in which, for example, functions may be executed out of order from that shown or discussed, including substantially concurrently or in reverse order, depending on the functionality involved, as would be understood by those having ordinary skill in the art.

It is noted that multiple instances of the disclosed systems and sub-systems may be present in various embodiments, and that references herein to a system or a sub-system (e.g., user devices 104, or servers 101, etc.) generally refers to one or more of the systems or sub-systems. In an alternative embodiment, the functionalities of multiple agents may be merged, modified, or split into a functionally equivalent set of systems and sub-systems. The various computing agents may comprise one or more computing devices, like the computing device 10 illustrated in FIG. 5 and/or the computer system 40 illustrated in FIG. 8.

FIG. 1 illustrates a block diagram of an exemplary operating environment for a delayed delivery system, in accordance with an embodiment of the invention. It is comprised of one or more user device(s) 103, one or more data source(s) 107, a network 110, and a release engine 101, which may be further comprised of a data acquisition system 102 and a release trigger system 106.

As described in detail below, the various systems and sub-systems work together to receive and store one or more messages with conditional release criteria. Once such a message request is received, the system queries the one or more data sources (if necessary) to obtain the digital data that a user has requested to be released based on a conditional criteria. Thereafter, the system determines if one or more conditional criteria are met, and if criteria are met, then the message is released for further delivery by a messaging server. In accordance, the operating environment of FIG. 1 illustrates how the messages and conditional criteria may be routed for storage, delivery, criteria evaluation, and release.

Generally, the system receives digital data that a user wants to send once a conditional criteria is met. In some instances, the digital data with a conditional may be referred to as a "capsule" for ease of reference. As described in greater detail below, a variety of different conditionals may be provided, including, but not limited to, a time-based conditional (i.e. a time capsule which may be released within at a certain date/time), an event-based conditional (i.e. an event capsule, which may be released when a certain event starts and/or ends), an outcome-based conditional (i.e. an outcome capsule, which may be released when a certain outcome is obtained), a location-based conditional (i.e. a location capsule, which may be released when the recipient is at a certain location), an association-based conditional (i.e. a connection capsule, which may be released when the distance between a user and a recipient and the nature of connection between a user and a recipient—as defined in a social networking system's social graph—is determined and/or verified).

In one embodiment, the release engine 101 intercepts digital data transmission requests by watching for, or filtering for conditional release payload information in digital data packet headers. Once the request is identified or intercepted, the release engine 101, via a data acquisition system 102, may obtain a copy of the digital data from one or more third party data sources 108 if necessary. For example, in some embodiments, the digital data payload may already be present in the message. However, in other embodiments or instances, the digital data payload information may be comprised of a reference URL or an identifier where the digital file may be stored. As would be readily apparent to a person of ordinary skill in the art, the digital files may be stored on a user's device, an on-premise server, or cloud servers. Once the digital file payload is located, the digital acquisition system retrieves the file and stores it in the release engine 101 servers.

The release trigger system 106 monitors conditionals that are associated with the user's request, and if the conditional criteria are met, releases the message so that it can be sent to one or more intended recipients via the user's preferred message delivery system. As described in more detail herein, the ground truth to determine if a conditional is met may be stored in the release engine 101, which can be queried by the release trigger system 106. In other instances, if the ground truth is not stored in the release engine 101, then the release trigger system 106 queries external databases that have high truth value or fidelity to determine if the requesting user's conditional is met. In one embodiment, the release trigger system 106 may query the ground truth database regularly or at pre-specified intervals. In other embodiments, the query may be triggered by other ground truth level events that are related to the requesting user's conditionals. Moreover, in one embodiment of the invention the release engine 106 may convert a data request from one form to another. For example, if the requesting user has requested a conditional release via an email messaging system, but has requested that the released data be transmitted to a user via a short-form messaging system, then the release trigger system 106 converts the data delivery format from email to SMS. Other conversions are possible as would be readily ascertainable by a person of ordinary skill in the art without departing from the scope of the invention.

Still referring to FIG. 1, the user device 103 may be used by a user to initiate a conditional message delivery or by recipients to view the delivered messages. In particular embodiments, each user device 103 may be an electronic device including hardware, software, or embedded logic components or a combination of two or more such components and capable of carrying out the appropriate functions implemented or supported by the user device 103. For example, and without limitation, a user device 103 may be a desktop computer system, a notebook computer system, a netbook computer system, a handheld electronic device, or a mobile telephone. The present disclosure contemplates any user device 103. A user device 103 may enable a network user at the user device 103 to access network 110. A user device 103 may enable its user to communicate with other users at other user devices 103.

A user device 103 may have a web browser, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user device 104 may enable a user to enter a Uniform Resource Locator (URL) or other address directing the web browser to a server, and the web browser may generate a Hyper Text Transfer Protocol (HTTP) request and communicate the HTTP request to server. The server may accept the HTTP request and communicate to the user device 104 one or more Hyper Text Markup Language (HTML) files responsive to the HTTP request. The user device 103 may render a web page based on the HTML files from server for presentation to the user. The present disclosure contemplates any suitable web page files. As an example and not by way of limitation, web pages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a web page encompasses one or more corresponding web page files (which a browser may use to render the web page) and vice versa, where appropriate.

The user device 103 may also include an application that is loaded onto the user device 104. The application 103 obtains data from the network 110 and displays it to the user within an application interface.

Exemplary user devices are illustrated in some of the subsequent figures provided herein. This disclosure contemplates any suitable number of user devices, including computing systems taking any suitable physical form. As example and not by way of limitation, computing systems may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, the computing system may include one or more computer systems; be unitary or distributed; span multiple locations; span multiple machines; or reside in a cloud, which may include one or more cloud components in one or more networks. Where appropriate, one or more computing systems may perform without substantial spatial or temporal limitation one or more steps of one or more methods described or illustrated herein. As an example, and not by way of limitation, one or more computing systems may perform in real time or in batch mode one or more steps of one or more methods described or illustrated herein. One or more computing system may perform at different times or at different locations one or more steps of one or more methods described or illustrated herein, where appropriate.

Still referring to FIG. 1, the data sources 107 may refer to digital data storage systems, such as storage on a user's computing device 103, data on on-premise servers, data on cloud severs, etc. More specifically, the digital data sources 107 may refer to servers of other computing systems such as social networking systems, message boards, photo sharing or data sharing system and website, etc. In one embodiment, the data sources 107 refers to social networking systems such as FACEBOOK, LINKEDIN, GOOGLE+, PINTREST, TWITTER, etc. The digital data payload stored within the various data sources 107 may be located via unique reference locators and the like, or via a specific mechanism as provided by the specific cloud or on-premise storage system or social networking system.

In one embodiment, and as described elsewhere herein, the data acquisition system 102 locates digital data payload that a user has requested to be sent conditionally based on unique resource locator codes and the like. In some embodiments, if the unique resource locator code is not provided in the conditional delivery request, then the data acquisition system 102 performs a search in public and private databases that the requesting user has given access to. In such embodiments, the data acquisition engine 102 may confirm with the requesting user that the searched for, and identified digital data payload is indeed the one that the requesting user wants to send conditionally. The specific system and method for obtaining the confirmation may vary, as would be readily ascertainable by persons of ordinary skill in the art, without departing from the scope of the invention.

The network 110 connects the various systems and computing devices described or referenced herein. In particular embodiments, network 110 is an intranet, an extranet, a virtual private network (VPN), a local area network (LAN), a wireless LAN (WLAN), a wide area network (WAN), a metropolitan area network (MAN), a portion of the Internet, or another network 421 or a combination of two or more such networks 110. The present disclosure contemplates any suitable network 110.

One or more links couple one or more systems, engines or devices to the network 110. In particular embodiments, one or more links each includes one or more wired, wireless, or optical links. In particular embodiments, one or more links each includes an intranet, an extranet, a VPN, a LAN, a WLAN, a WAN, a MAN, a portion of the Internet, or another link or a combination of two or more such links. The present disclosure contemplates any suitable links coupling one or more systems, engines or devices to the network 110.

In particular embodiments, each system or engine may be a unitary server or may be a distributed server spanning multiple computers or multiple datacenters. Systems, engines, or modules may be of various types, such as, for example and without limitation, web server, news server, mail server, message server, advertising server, file server, application server, exchange server, database server, or proxy server. In particular embodiments, each system, engine or module may include hardware, software, or embedded logic components or a combination of two or more such components for carrying out the appropriate functionalities implemented or supported by their respective servers. For example, a web server is generally capable of hosting websites containing web pages or particular elements of web pages. More specifically, a web server may host HTML files or other file types, or may dynamically create or constitute files upon a request, and communicate them to client devices or other devices in response to HTTP or other requests from clients devices or other devices. A mail server is generally capable of providing electronic mail services to various client devices or other devices. A database server is generally capable of providing an interface for managing data stored in one or more data stores.

In particular embodiments, one or more data storages may be communicatively linked to one or more servers via one or more links. In particular embodiments, data storages may be used to store various types of information. In particular embodiments, the information stored in data storages may be organized according to specific data structures. In particular embodiment, each data storage may be a relational database. Particular embodiments may provide interfaces that enable servers or clients to manage, e.g., retrieve, modify, add, or delete, the information stored in data storage.

The system may also contain other subsystems and databases, which are not illustrated in FIG. 1, but would be readily apparent to a person of ordinary skill in the art. For example, the system may include databases for storing data, storing features, storing outcomes (training sets), and storing models. Other databases and systems may be added or subtracted, as would be readily understood by a person of ordinary skill in the art, without departing from the scope of the invention.

Figure 2:
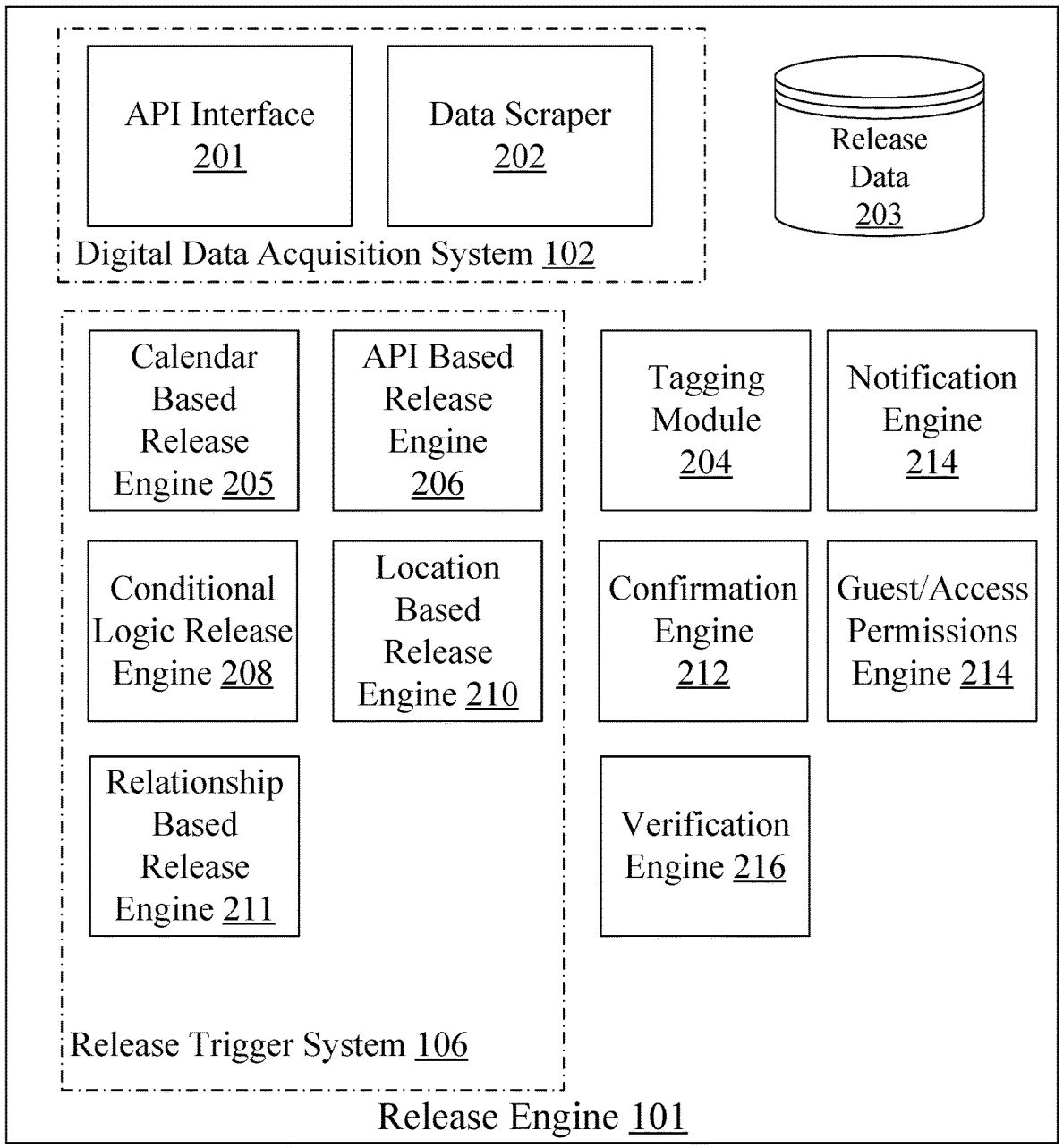
FIG. 2 is a block diagram illustrating an exemplary release engine in accordance with an embodiment of the invention.

FIG. 2 is a block diagram illustrating an exemplary release engine in accordance with an embodiment of the invention. It is comprised of a digital data acquisition system 102 (which is further comprised of an API interface 201 and a data scraper 202), a release trigger system 106 (which is further comprised of calendar based release engine 205, API based release engine 206, conditional logic release engine 208, and location based release engine 210), release data 203, tagging module 204, confirmation engine 212, notification engine 214, and the guest/access permissions engine (215).

The digital data acquisition system 102 and the release trigger system 106 are described in greater detail above in reference to FIG. 1. But generally, as described herein, the digital data acquisition system 102 identifies and retrieves digital data payload information from one or more data sources 107. In one embodiment, the API Interface 201 uses one or more API interface systems such as Web APIs, Simple Object Access Protocol (SOAP) APIs, Remote Procedure Call (RPC) APIs, and/or Representational State Transfer (REST) API systems to collect data from one or more data sources 107. The specific implementation details for initiating an API system are ascertainable by a person of ordinary skill in the art, and may be used herein without departing from the scope of the invention. The data scraper 202 scrapes digital data from one or more data sources 107. The data scraper 202 may be used when API access is not available to locate and retrieve digital payload data. In some embodiments, the data scraper 202 and the API interface 201 may be used in conjunction to locate and retrieve digital data payloads that a requesting user wants to conditionally send.

The release trigger system 106 is also described in detail above with reference to FIG. 1. But generally, as described herein, the release trigger system 106 queries truth sources to determine if a condition set forth by the requesting user is met. For example, the calendar-based release engine 205 queries a ground truth source such as a master calendar to determine if release date or event criteria are met. The API based release engine 206 queries data sources 107 to determine if certain even trigger criteria are met. In this instance, the API based release engine 206 treats the data source 107 as a source of ground truth. The conditional logic release engine 208 uses conditional logic to determine if a release trigger is met. For example, if a user sets an initial condition to release a digital message if the ATLANTA FALCONS win the SUPERBOWL, then the conditional logic release engine 208 queries a truth source to determine the date and time of the conclusion of a SUPERBOWL. Thereafter, the conditional logic release engine 208 queries a truth source to determine if the ATLANTA FALCONS have won the SUPERBOWL. If they have won the SUPERBOWL, then the conditional logic release engine 208 releases the digital media to the intended recipients.

The location-based release engine 210 queries a location database to determine if a location-based criteria is met. For example, if a recipient has entered a geo-fenced area or if the recipient's geo-location, as determined, for example, by the location of the recipient's computing device 103, suggests that a receipt is at or near a location set by the requesting user, then the location based release engine 210 initiates a release protocol to release the message from the release engine 101 to a messaging server for delivering the digital data payload to the user. In one embodiment of the invention, the location-based release engine 210 may be triggered by the requesting user's location. In such an embodiment, the location-based release engine 210 queries a location database associated with the requesting user. If the requesting user is at or near a predefined location, then the location-based release engine 210 initiates a release protocol to release the message from the release engine 101 to a messaging server for delivering the digital data payload to the user. The specific methods for querying a geolocationbased database to ascertain a user's or a recipient's location are readily ascertainable by persons of ordinary skill in the art, any one or more of those various methodologies may be used without departing from the scope of the invention.

In one embodiment of the invention, a proprietary location determination system and method may be used to minimize the battery drain that may be otherwise associated with querying location data on a recipient's mobile computing device. For example, in one embodiment of the invention, the location-based release engine 210 stores the location that is associated with digital data that a user wants to share with a recipient in a location capsule. A variety of different types of location information may be used, including coordinate data, GNSS data such as GPS data, GLONASS data, etc. In one embodiment of the invention, the location-based release engine 210 queries the recipient's computing device at a periodic interval to determine whether the recipient is at a location that is provided in the location capsule. In one embodiment, the frequency or the next location query on the recipient's device may be determined based on the recipient's location at the last query and the speed and direction of the recipient's movement. As such, the next location query on the recipient's device may be dynamically generated. For example, if a recipient is in Atlanta, Ga. and the location capsule is set to release when the recipient is at or near the BOSTON COMMONS in Boston, Mass., the next location query may be set for the shortest theoretical and/or practical travel time to travel from ATLANTA, GEORGIA to BOSTON, MASSACHUSETTS. Moreover, if the recipient is deemed to be traveling by a aerial vehicle (which may be indicated by proximity to an airport, for example, or other public or private information that may be obtained from public databases or may be shared by the recipient) or in a land-based vehicle, then the next location query may be set based on the expected theoretical or practical amount of time that it may take to travel from the recipient's current location to the location in the time capsule. Similarly, if the direction of the recipient's travel is determined to be in the direction of the location in the time-capsule and/or away from the location in the time-capsule, then the next query may be adjusted based on that information (i.e., if the recipient is determined to travel towards the location-capsule's location, then the next query may be closer to a theoretical or practical travel time to travel from the recipient's location to the time-capsule location; on the other hand, if the recipient is determined to be traveling away from the location in the time-capsule, then the next location determination query on the recipient's device may be extended beyond the theoretical or practical amount of time required to travel from the recipient's location to the capsule location). In one embodiment of the invention, a theoretical time may represent the theoretical amount of time that it may take to travel from the recipient's location to the capsule location via a travel mechanism. Practical time may represent other factors that may either speed up or slow down the recipient from traveling from his or her location to the capsule location, including, for example, but not limited to traffic, transit change time, if, for example, using public transportation, delays due to weather or other events, etc. In one embodiment, the timing of the next location determination query on the recipient's device may be calculated based on an immediately prior location determination query. In other embodiments, the next location determination query may be calculated based on historical location determination queries and the patterns that may emerge from those queries. By using the querying system and method described herein, the present invention permits fewer location queries on the recipient's computing device. Moreover, the disclosed system and method reduces the battery drain that may be associated with the such queries. In one embodiment, the recipient may force a location query at any given time.

In one embodiment of the invention, a relationship-based release engine 211 releases a capsule if the distance between relationships, within a social networking system, for example, and the nature of the relationship meets a criteria set by the sender. For example, if a user creates a capsule that is to be shared only with immediate family members, then the relationship-based release engine 211 identifies V1 relationships within a social networking graph that have been verified and transmits the capsule to the V1 verified recipients. In one embodiment of the invention, a user may create a capsule and create a conditional wherein the capsule may be shared when a new member is added to the user's immediate family. In one embodiment of the invention, the process and system described herein may identify new V1 additions that have been verified and sends a capsule to the new additions. In one embodiment of the invention, the inventive system and process described herein may monitor trending topics or content of feeds that are collectively generated by V1 connections to identify and/or verify whether triggering events have occurred. In that sense, the V1 feed may serve as a truth source for verification purposes—in other words, if a sufficient number of V1 connections confirm or verify an event or discuss a certain topic, that confirmation and/or verification and/or discussion may serve as a localized truth source.

In one embodiment of the invention, a verification engine 216 may be used to ensure that a person cannot create multiple accounts within the social networking system. Generally, when a user signs up for the social networking system, he or she may be required to submit a facial recognition scan. The obtained facial recognition scan may be compared to a database of scans to ensure that a user has not created multiple accounts within the social networking system. In other words, the social networking system determines whether a facial scan is unique when an account is created. If it is, then the user may be permitted to complete the account creation process.

In one embodiment of the invention, the verification engine 216 may generate a family tree of nodes within a social graph to verify users. The family tree may also be used for calculating distance and types of relationships within the social networking system and to determine or verify whether certain conditionals for releasing a capsule are met. In one embodiment, a family tree may be generated when a user associates with another user as a family member. Upon such an association, the recipient user may be asked to verify the relationship. Once such a verification is obtained, other users who are connected to either the sending user and/or the recipient user a immediate family may also receive a notification that an immediate family relationship has been established between a family member and another user. In one embodiment, each family member may receive a notification and may be asked to verify the new association between the sending user and the recipient user. The more immediate family members that verify the relationship, the higher the likelihood that may be assigned to a correct connection. This verification process helped ensure the validity of various relationships in a tree of nodes within a social networking system.

The release data store 203, the tagging module 204, the confirmation engine 212, and the notification engine 214 enable the release engine 101 to initiate a data release protocol for transmitting digital data from the release engine 101 to the messaging servers, which further deliver the digital data to the recipient. The release data store 203 stores digital data that is obtained by the digital data acquisition system 102. In one embodiment, the actual digital file may be stored in the data store 203. However, in other embodiments, a locator ID for retrieving the digital data may be stored in the data store 203. The tagging module 204 creates a relational database for generating database relationships such that user(s) and or recipient(s) may sort and/or archive digital data for ease of retrieval.

The confirmation engine 212 confirms whether the conditional criteria set forth by the requesting user has in fact been met. In one embodiment, the confirmation engine 212 queries a different set of databases or a different ground truth to independently verify whether a conditional criteria have been met. The notification engine 214 alerts the user(s) and or the recipient(s) that the digital data has been released and/or received and/or consumed. The guest/access permissions engine 214 verifies whether a guest or an authorized user is permitted to trigger a release trigger. For example, a user may set up a guest/release access for another person who may access the user's account—if certain conditions are met—and initiate a trigger/release event. In one specific example, a user may set up guest access for the executor of his or her estate. In the event of the user's death, and upon access by the guest/executor, the system generates a series of notifications to reach the user. For example, the system may call the user's phone number several times to request a password. The system may also send several emails to one or more email address provided by the user, or send text-messages or multi-media messages to reach the users. If these attempts are unsuccessful, the guest/executor is permitted to initiate the release/trigger. It should be noted that in these circumstances, the guest/executor may be only permitted to trigger a release event. The guest/executor/release agent may not be able to access any other information associated with the user's account.

Figure 3:
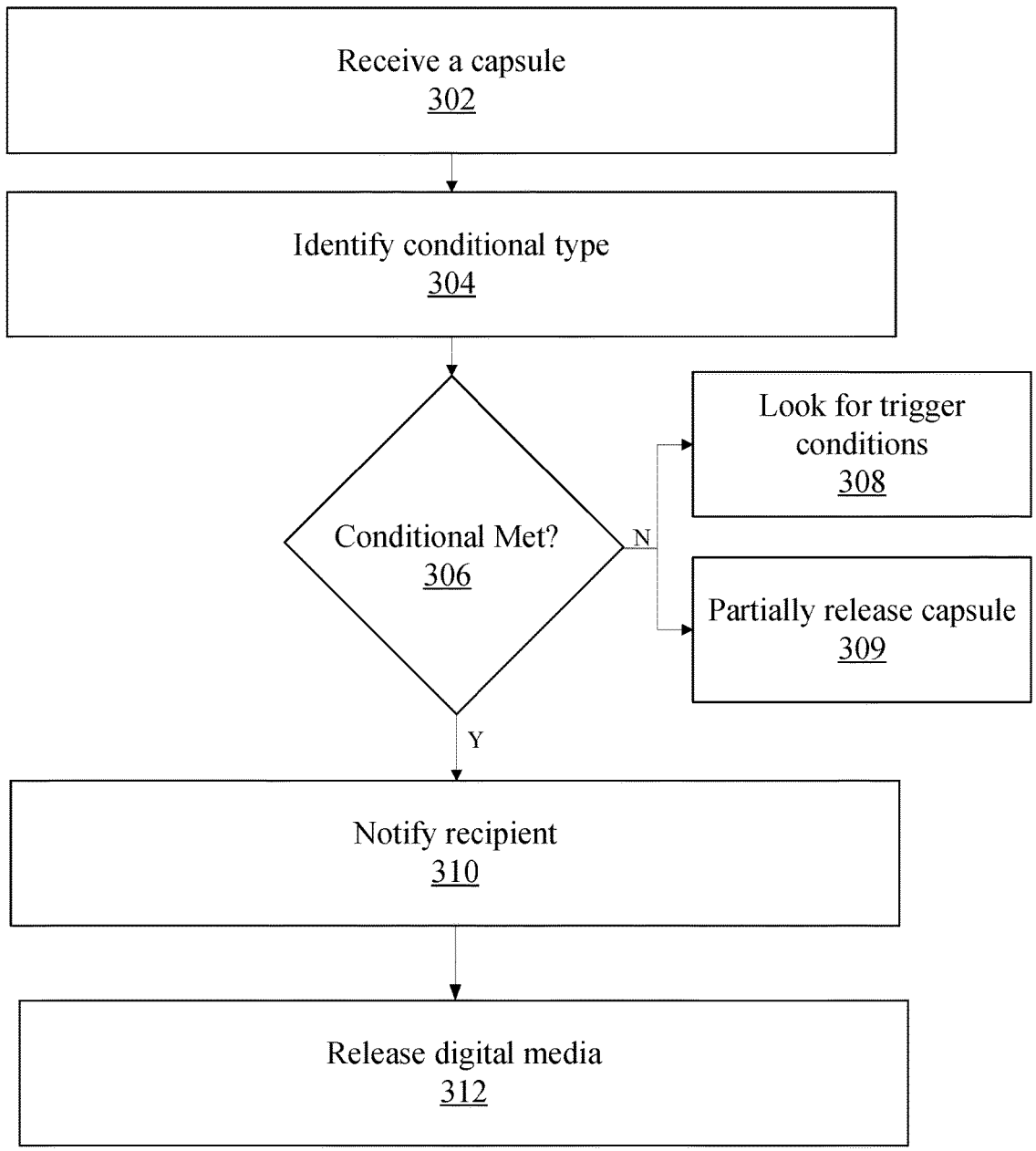
FIG. 3 is a process diagram illustrating an exemplary method for executing the invention, in accordance with an embodiment of the invention.

FIG. 3 is a process diagram illustrating an exemplary method for executing the invention, in accordance with an embodiment of the invention. The process begins by receiving a capsule 302. As described above, a capsule may be comprised of digital data with a conditional, wherein the digital data may be released to an intended recipient if conditional criteria set forth in the capsule are met. In one embodiment of the invention, a capsule may be comprised digital payload data, intended recipient data, and conditional data, wherein the intended recipient information may include a identifier for a recipient, such as the recipient's email address, phone number, or in the context of a social networking system, an identifier that is associated with the recipient's account within the social graph.

The process continues by identifying the type of conditional 304 that is provided in the capsule. As described above, a variety of conditionals may be provided, including, but not limited to a calendar based conditional, API based conditional, location based conditional, event based conditional, death based conditional etc. A calendar based conditional may be satisfied when a certain date or time—that is specified in the capsule—is detected. An API based conditional may be satisfied when certain data, which may be set forth in the capsule, is detected. A location based conditional may be satisfied when a recipient is detected to be at or near a location that is specified in the capsule. An event based conditional may be satisfied when an event has started or ended. Death based conditional may be satisfied when it is confirmed that the sender has passed away.

Figure 4:
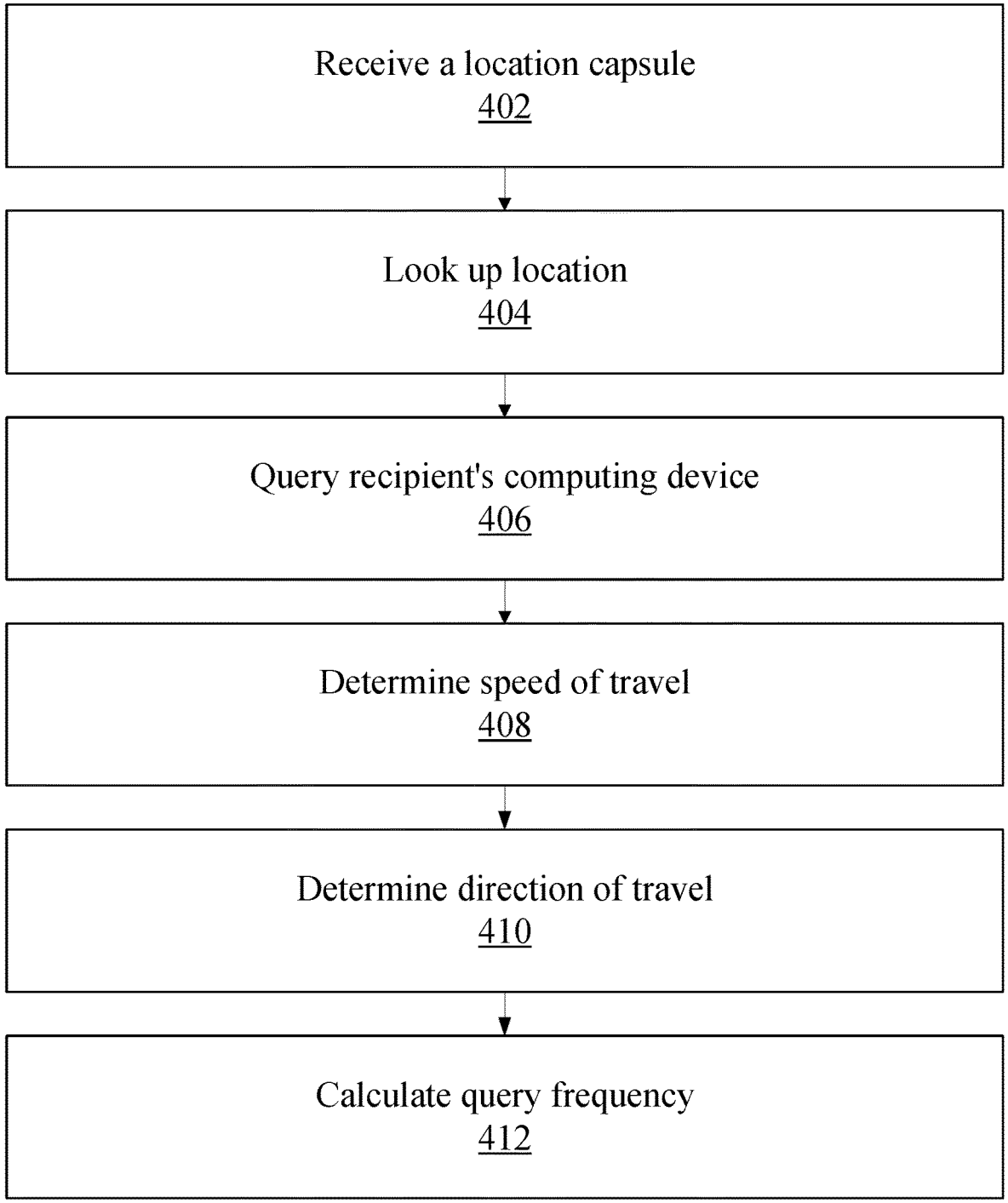
FIG. 4 is an illustration of a graphical user interface in accordance with an exemplary embodiment of the invention.

The process continues by determining whether the conditional is met 306. Each conditional type may have its own set of conditional met 306 analysis. For example, a calendar based conditional may cause the process to determine if the date and/or time requested by the sender is met by querying a trusted truth source. The API based conditional may be met when data is received and/or pulled from an API source as set forth in the capsule. A location based conditional may be satisfied when a recipient is deemed to be at or near a location that is specified in the capsule. FIG. 4 illustrates the process of determining whether a recipient is at or near a location. An event based conditional may cause the process to determine if the event specified by the sender has started and/or completed. For example, if a sender has sent a capsule with an event based conditional, such as: send a message if the ATLANTA FALCONS win the SUPERBOWL. In this instance, the process may query a truth source to determine when the SUPERBOWL is scheduled to occur. Then the process may determine whether ATLANTA FALCONS are playing in the SUPERBOWL. If the ALTANTA FALCONS are deemed to play in the SUPERBOWL, then the process may look for the trigger conditions 308 at or around when the SUPERBOWL is scheduled to complete.

While the process is looking for trigger conditions 308, a partially viewable capsule 309 may be made available to the recipient. For example, if an image is shared as a capsule, then a partially blurred image may be made available to the recipient while the process is looking for trigger conditions 308. If text is shared by a sender, then partially viewable text and/or one or more words within the shared text may be made available to the recipient 309 while the process is looking for trigger conditions 308.

If a death based conditional is set in a capsule, then the process may determine if a conditional is met 306 by querying a truth source, such as a morgue or a newspaper database. In one embodiment, the process may determine 306 that the conditional is met by identifying close family members of the deceased within the social networking system. If the deceased's close family (i.e. social graph nodes with a first degree of family connection) have created posts with words or sentiments expressing condolences and/or grief that are directed at the deceased. If a death based conditional is initiated, a release agent may be contacted to confirm release. If the release agent provides a release authorization, then the sender may be notified that a release authorization has been received from at least one release agent, the notification comprising a cancellation election within a graphical user interface enabling the sender to cancel the release of death conditional capsule. The process may also contact the sender through a communications means outside of the social networking system if the sender has requested additional contact attempts, the contact enabling the sender to provide a cancellation election to cancel the release of death conditional capsule. If a cancellation is not received from the sender within a pre-determined period of time, then the process notifies 310 the recipient and releases the capsuled digital data 312 to the recipient.

FIG. 4 illustrates a process for processing a location base capsule. In one embodiment, the process receives 402 a location capsule. As provided above, a location capsule has a conditional that may be satisfied when a recipient is detected to be at or near a location that is specified in the capsule. Generally, constantly pinging a recipient's computing device for its location is not very efficient and may lead to significant battery drain. The process described herein, permits the process and the system to check a recipient's location in a manner that reduces battery consumption. The process continues by looking up 404 the location that is provided in the location based capsule. A variety of different types of location information may be used, including coordinate data, GNSS data such as GPS data, GLONASS data, etc. In one embodiment of the invention, the process queries 406 the recipient's computing device at a periodic interval to determine whether the recipient is at a location that is provided in the location capsule. In one embodiment, the frequency or the next location query 412 on the recipient's device may be determined based on the recipient's location at the last query and the speed and direction of the recipient's movement. As such, the next location query on the recipient's device may be dynamically generated. For example, if a recipient is in ATLANTA, GEORGIA and the location capsule is set to release when the recipient is at or near the BOSTON COMMONS in Boston, Mass., the next location query may be set for the shortest theoretical and/or practical travel time to travel from Atlanta, Ga. to Boston, Mass. Moreover, if the recipient is deemed to be traveling by an aerial vehicle 408 (which may be indicated by proximity to an airport, for example, or other public or private information that may be obtained from public databases or may be shared by the recipient) or in a land-based vehicle, then the next location query may be set based on the expected theoretical or practical amount of time that it may take to travel from the recipient's current location to the location in the capsule. Similarly, if the direction 410 of the recipient's travel is determined to be in the direction of the location in the time-capsule and/or away from the location in the time-capsule, then the next query may be adjusted based on that information (i.e., if the recipient is determined to travel towards the location-capsule's location, then the next query may be closer to a theoretical or practical travel time to travel from the recipient's location to the time-capsule location; on the other hand, if the recipient is determined to be traveling away 410 from the location in the time-capsule, then the next location determination query on the recipient's device may be extended beyond the theoretical or practical amount of time required to travel from the recipient's location to the capsule location). In one embodiment of the invention, a theoretical time may represent the theoretical amount of time that it may take to travel from the recipient's location to the capsule location via a travel mechanism. Practical time may represent other factors that may either speed up or slow down the recipient from traveling from his or her location to the capsule location, including, for example, but not limited to traffic, transit change time, if, for example, using public transportation, delays due to weather or other events, etc. In one embodiment, the timing of the next location determination query on the recipient's device may be calculated based on an immediately prior location determination query. In other embodiments, the next location determination query may be calculated based on historical location determination queries and the patterns that may emerge from those queries. By using the querying system and method described herein, the present invention permits fewer location queries on the recipient's computing device. Moreover, the disclosed system and method reduces the battery drain that may be associated with the such queries. In one embodiment, the recipient may force a location query at any given time.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the embodiments disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific embodiments, at least some of the features or functionalities of the various embodiments disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some embodiments, at least some of the features or functionalities of the various embodiments disclosed herein may be implemented in one or more virtualized computing environments (e.g., network computing clouds, virtual machines hosted on one or more physical computing machines, or other appropriate virtual environments).

Figure 5:
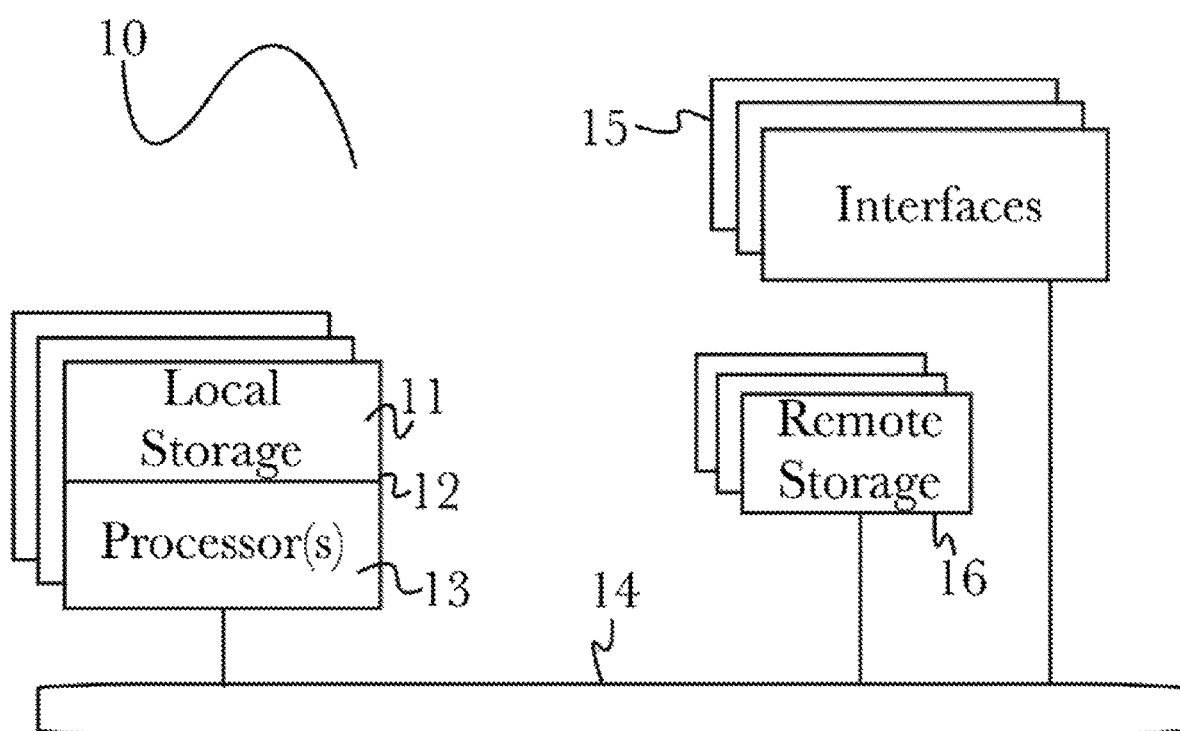
FIG. 5 is a block diagram illustrating an exemplary hardware architecture of a computing device, according to a preferred embodiment of the invention.

Referring now to FIG. 5, there is shown a block diagram depicting an exemplary computing device 10 suitable for implementing at least a portion of the features or functionalities disclosed herein. Computing device 10 may be, for example, any one of the computing machines listed in the previous paragraph, or indeed any other electronic device capable of executing software- or hardware-based instructions according to one or more programs stored in memory. Computing device 10 may be configured to communicate with a plurality of other computing devices, such as clients or servers, over communications networks such as a wide area network a metropolitan area network, a local area network, a wireless network, the Internet, or any other network, using known protocols for such communication, whether wireless or wired.

In one aspect, computing device 10 includes one or more central processing units (CPU) 12, one or more interfaces 15, and one or more busses 14 (such as a peripheral component interconnect (PCI) bus). When acting under the control of appropriate software or firmware, CPU 12 may be responsible for implementing specific functions associated with the functions of a specifically configured computing device or machine. For example, in at least one aspect, a computing device 10 may be configured or designed to function as a server system utilizing CPU 12, local memory 11 and/or remote memory 16, and interface(s) 15. In at least one aspect, CPU 12 may be caused to perform one or more of the different types of functions and/or operations under the control of software modules or components, which for example, may include an operating system and any appropriate applications software, drivers, and the like.

CPU 12 may include one or more processors 13 such as, for example, a processor from one of the Intel, ARM, Qualcomm, and AMD families of microprocessors. In some embodiments, processors 13 may include specially designed hardware such as application-specific integrated circuits (ASICs), electrically erasable programmable read-only memories (EEPROMs), field-programmable gate arrays (FPGAs), and so forth, for controlling operations of computing device 10. In a particular aspect, a local memory 11 (such as non-volatile random-access memory (RAM) and/or read-only memory (ROM), including for example one or more levels of cached memory) may also form part of CPU 12. However, there are many different ways in which memory may be coupled to system 10. Memory 11 may be used for a variety of purposes such as, for example, caching and/or storing data, programming instructions, and the like. It should be further appreciated that CPU 12 may be one of a variety of system-on-a-chip (SOC) type hardware that may include additional hardware such as memory or graphics processing chips, such as a QUALCOMM SNAPDRAGON™ or SAMSUNG EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one aspect, interfaces 15 are provided as network interface cards (NICs). Generally, NICs control the sending and receiving of data packets over a computer network; other types of interfaces 15 may for example support other peripherals used with computing device 10. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g., using near-field magnetics), 802.11 (WiFi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 15 may include physical ports appropriate for communication with appropriate media. In some cases, they may also include an independent processor (such as a dedicated audio or video processor, as is common in the art for high-fidelity A/V hardware interfaces) and, in some instances, volatile and/or non-volatile memory (e.g., RAM).

Although the system shown in FIG. 5 illustrates one specific architecture for a computing device 10 for implementing one or more of the embodiments described herein, it is by no means the only device architecture on which at least a portion of the features and techniques described herein may be implemented. For example, architectures having one or any number of processors 13 may be used, and such processors 13 may be present in a single device or distributed among any number of devices. In one aspect, single processor 13 handles communications as well as routing computations, while in other embodiments a separate dedicated communications processor may be provided. In various embodiments, different types of features or functionalities may be implemented in a system according to the aspect that includes a client device (such as a tablet device or smartphone running client software) and server systems (such as a server system described in more detail below).

Regardless of network device configuration, the system of an aspect may employ one or more memories or memory modules (such as, for example, remote memory block 16 and local memory 11) configured to store data, program instructions for the general-purpose network operations, or other information relating to the functionality of the embodiments described herein (or any combinations of the above). Program instructions may control execution of or comprise an operating system and/or one or more applications, for example. Memory 16 or memories 11, 16 may also be configured to store data structures, configuration data, encryption data, historical system operations information, or any other specific or generic non-program information described herein.

Because such information and program instructions may be employed to implement one or more systems or methods described herein, at least some network device embodiments may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a JAVA™ compiler and may be executed using a Java virtual machine or equivalent, or files containing higher level code that may be executed by the computer using an interpreter (for example, scripts written in Python, Perl, Ruby, Groovy, or any other scripting language).

Figure 6:
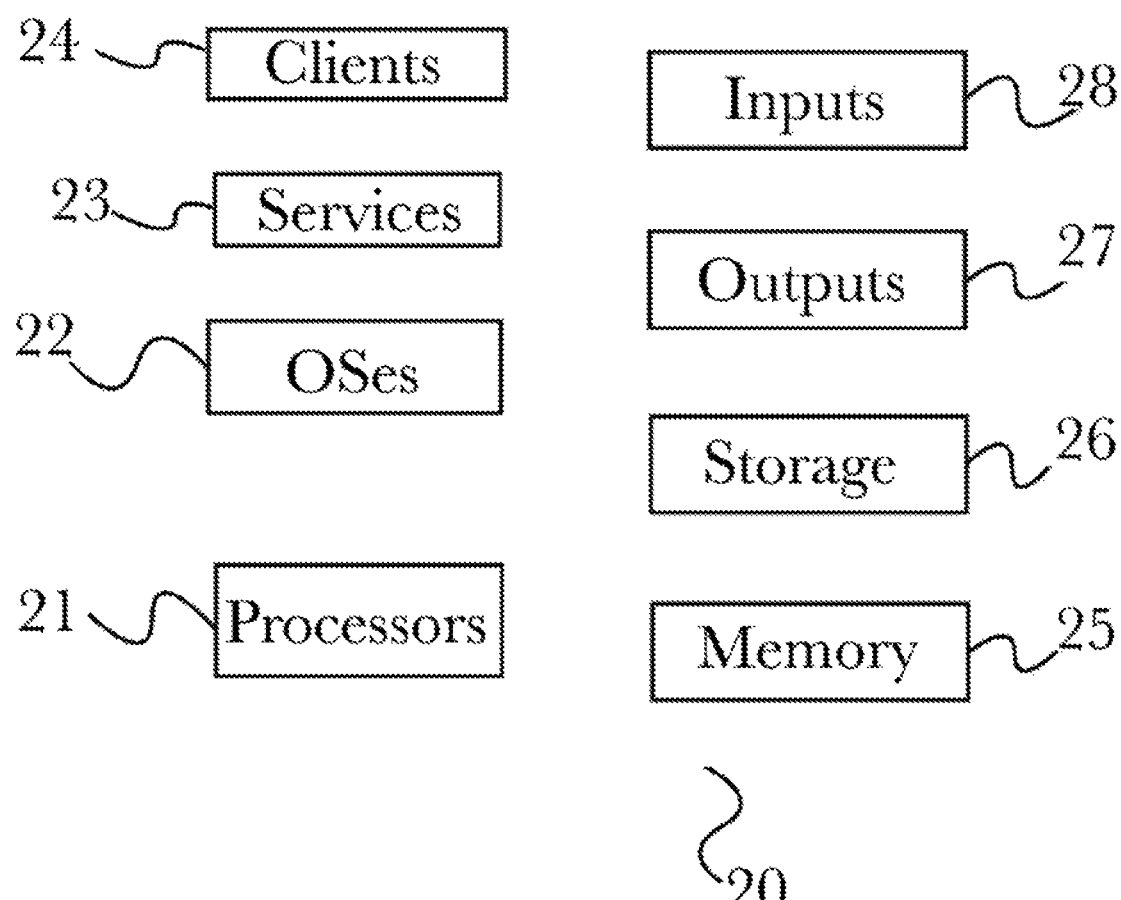
FIG. 6 is a block diagram illustrating an exemplary logical architecture for a client device, according to a preferred embodiment of the invention.

In some embodiments, systems may be implemented on a standalone computing system. Referring now to FIG. 6, there is shown a block diagram depicting a typical exemplary architecture of one or more embodiments or components thereof on a standalone computing system. Computing device 20 includes processors 21 that may run software that carry out one or more functions or applications of embodiments, such as for example a client application 24. Processors 21 may carry out computing instructions under control of an operating system 22 such as, for example, a version of MICROSOFT WINDOWS™ operating system, APPLE macOS™ or iOS™ operating systems, some variety of the Linux operating system, ANDROID™ operating system, or the like. In many cases, one or more shared services 23 may be operable in system 20, and may be useful for providing common services to client applications 24. Services 23 may for example be WINDOWS™ services, user-space common services in a Linux environment, or any other type of common service architecture used with operating system 21. Input devices 28 may be of any type suitable for receiving user input, including for example a keyboard, touchscreen, microphone (for example, for voice input), mouse, touchpad, trackball, or any combination thereof. Output devices 27 may be of any type suitable for providing output to one or more users, whether remote or local to system 20, and may include for example one or more screens for visual output, speakers, printers, or any combination thereof. Memory 25 may be random-access memory having any structure and architecture known in the art, for use by processors 21, for example to run software. Storage devices 26 may be any magnetic, optical, mechanical, memristor, or electrical storage device for storage of data in digital form (such as those described above, referring to FIG. 5). Examples of storage devices 26 include flash memory, magnetic hard drive, CD-ROM, and/or the like.

Figure 7:
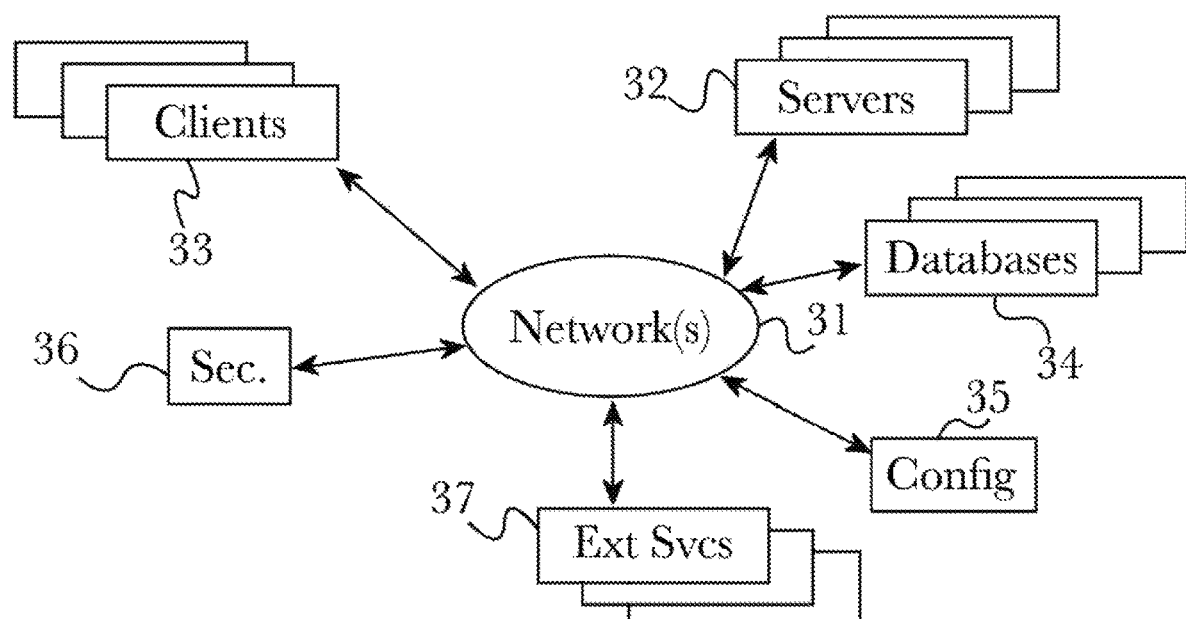
FIG. 7 is a block diagram showing an exemplary architectural arrangement of clients, servers, and external services, according to a preferred embodiment of the invention.

In some embodiments, systems may be implemented on a distributed computing network, such as one having any number of clients and/or servers. Referring now to FIG. 7, there is shown a block diagram depicting an exemplary architecture 30 for implementing at least a portion of a system according to one aspect on a distributed computing network. According to the aspect, any number of clients 33 may be provided. Each client 33 may run software for implementing client-side portions of a system; clients may comprise a system 20 such as that illustrated in FIG. 6. In addition, any number of servers 32 may be provided for handling requests received from one or more clients 33. Clients 33 and servers 32 may communicate with one another via one or more electronic networks 31, which may be in various embodiments any of the Internet, a wide area network, a mobile telephony network (such as CDMA or GSM cellular networks), a wireless network (such as WiFi, WiMAX, LTE, and so forth), or a local area network (or indeed any network topology known in the art; the aspect does not prefer any one network topology over any other). Networks 31 may be implemented using any known network protocols, including for example wired and/or wireless protocols.

In addition, in some embodiments, servers 32 may call external services 37 when needed to obtain additional information, or to refer to additional data concerning a particular call. Communications with external services 37 may take place, for example, via one or more networks 31. In various embodiments, external services 37 may comprise webenabled services or functionality related to or installed on the hardware device itself. For example, in one aspect where client applications 24 are implemented on a smartphone or other electronic device, client applications 24 may obtain information stored in a server system 32 in the cloud or on an external service 37 deployed on one or more of a particular enterprise's or user's premises.

In some embodiments, clients 33 or servers 32 (or both) may make use of one or more specialized services or appliances that may be deployed locally or remotely across one or more networks 31. For example, one or more databases 34 may be used or referred to by one or more embodiments. It should be understood by one having ordinary skill in the art that databases 34 may be arranged in a wide variety of architectures and using a wide variety of data access and manipulation means. For example, in various embodiments one or more databases 34 may comprise a relational database system using a structured query language (SQL), while others may comprise an alternative data storage technology such as those referred to in the art as "NoSQL" (for example, HADOOP CASSANDRA™, GOOGLE BIGTABLE™, and so forth). In some embodiments, variant database architectures such as column-oriented databases, in-memory databases, clustered databases, distributed databases, or even flat file data repositories may be used according to the aspect. It will be appreciated by one having ordinary skill in the art that any combination of known or future database technologies may be used as appropriate, unless a specific database technology or a specific arrangement of components is specified for a particular aspect described herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, some embodiments may make use of one or more security systems 36 and configuration systems 35. Security and configuration management are common information technology (IT) and web functions, and some amount of each are generally associated with any IT or web systems. It should be understood by one having ordinary skill in the art that any configuration or security subsystems known in the art now or in the future may be used in conjunction with embodiments without limitation, unless a specific security 36 or configuration system 35 or approach is specifically required by the description of any specific aspect.

Figure 8:
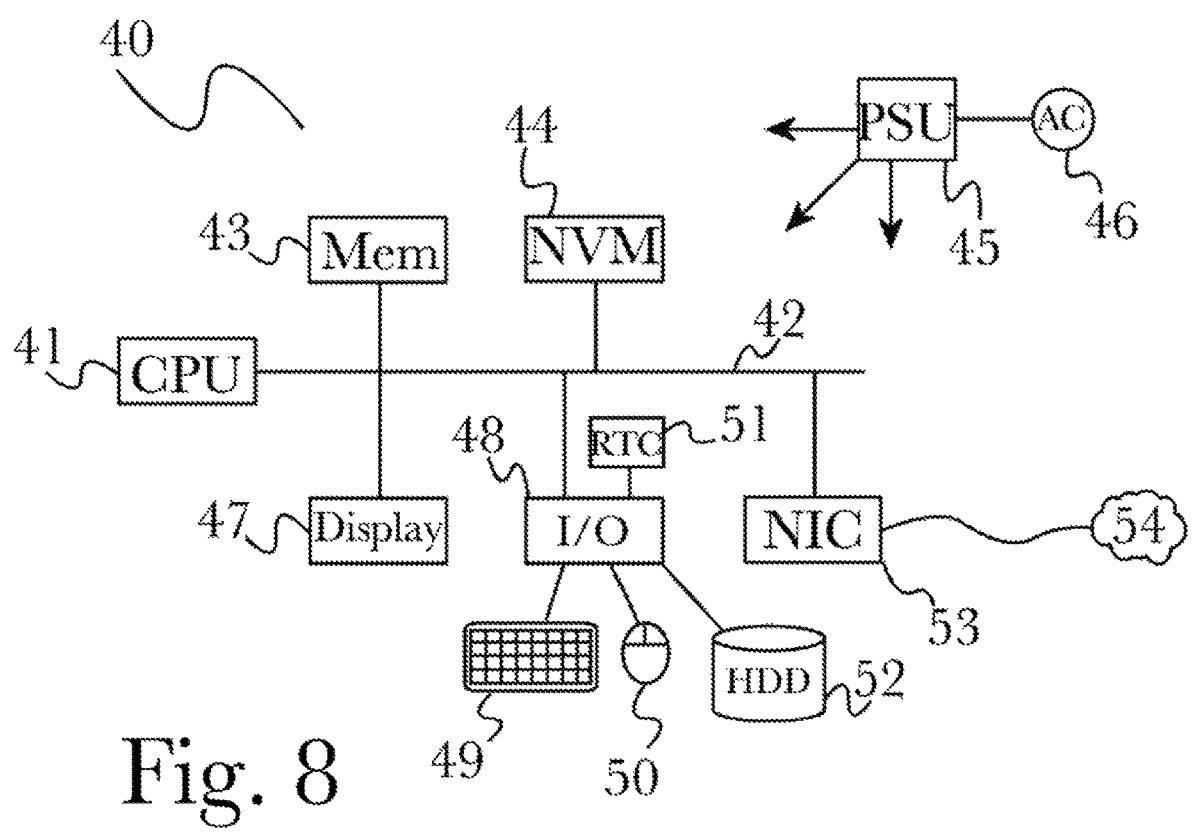
FIG. 8 is another block diagram illustrating an exemplary hardware architecture of a computing device, according to a preferred embodiment of the invention.

FIG. 8 shows an exemplary overview of a computer system 40 as may be used in any of the various locations throughout the system. It is exemplary of any computer that may execute code to process data. Various modifications and changes may be made to computer system 40 without departing from the broader scope of the system and method disclosed herein. Central processor unit (CPU) 41 is connected to bus 42, to which bus is also connected memory 43, nonvolatile memory 44, display 47, input/output (I/O) unit 48, and network interface card (NIC) 53. I/O unit 48 may, typically, be connected to keyboard 49, pointing device 50, hard disk 52, and real-time clock 51. NIC 53 connects to network 54, which may be the Internet or a local network, which local network may or may not have connections to the Internet. Also shown as part of system 40 is power supply unit 45 connected, in this example, to a main alternating current (AC) supply 46. Not shown are batteries that could be present, and many other devices and modifications that are well known but are not applicable to the specific novel functions of the current system and method disclosed herein. It should be appreciated that some or all components illustrated may be combined, such as in various integrated applications, for example Qualcomm or Samsung system-on-a-chip (SOC) devices, or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various embodiments, functionality for implementing systems or methods of various embodiments may be distributed among any number of client and/or server components. For example, various software modules may be implemented for performing various functions in connection with the system of any particular aspect, and such modules may be variously implemented to run on server and/or client components.

The skilled person will be aware of a range of possible modifications of the various embodiments described above. Accordingly, the present invention is defined by the claims and their equivalents.

ADDITIONAL CONSIDERATIONS

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for creating an interactive message through the disclosed principles herein. Thus, while particular embodiments and applications have been illustrated and described, it is to be understood that the disclosed embodiments are not limited to the precise construction and components disclosed herein. Various apparent modifications, changes and variations may be made in the arrangement, operation and details of the method and apparatus disclosed herein without departing from the spirit and scope defined in the appended claims.

What is claimed is:

1. A computer program product for delivering and displaying capsuled digital data, the computer program product comprising a non-transitory computer readable storage medium having instructions encoded thereon that, when executed by a processor, cause the processor to:

receive capsuled digital data, the capsuled digital data comprising recipient information, release agent information, digital data to display to a recipient, and trigger event information for digitally releasing the capsuled digital data to the recipient, the trigger event information comprising a trigger event that must be met in order to release the capsuled digital data to the recipient, and the digital data including one or more of an image or text that includes a plurality of words;

generate a partially viewable version of the capsuled digital data responsive to sender preferences, the partially viewable version of the capsulated digital data including one or more of a blurred version of the image or a subset of the plurality of words in the text, the subset of the plurality of words being less than an entirety of the plurality of words;

notify the recipient that a capsuled message has been created for the recipient, the notification comprising the trigger event information associated with the capsuled message;

provide, in a graphical user interface, one or more of the blurred version of the image or the subset of the plurality of words in the text, the one or more of the blurred version of the image or the subset of the plurality of words in the text being available to the recipient until a trigger event is met;

determine whether the trigger event is met, the determining based, at least in part, on a relationship-based release engine identifying a distance between two or more relationships in a social group;

provide an updated partially viewable version of the capsuled digital data upon determining that the trigger event will be met; and provide the capsuled digital data to the recipient upon determining that the trigger event is met.

2. The computer program product of claim 1, wherein identifying the distance between the two or more relationships in the social group comprises generating a family tree of users within the social group.

3. The computer program product of claim 1, wherein the distance between the two or more relationships in the social group is defined, at least in part, by a relationship between two or more members of a family.

4. The computer program product of claim 1, wherein the social group is limited to family members of an individual who created the capsuled digital data.

5. The computer program product of claim 1, wherein the capsuled digital data is generated by a sender within a social networking system.

6. The computer program product of claim 1, wherein the capsuled digital data includes recipient information for identifying the recipient within the social networking system.

7. The computer program product of claim 1, wherein the trigger event information is comprised of at least one of a calendar based trigger, an event based trigger, a condition based trigger, a location based trigger, and a release agent based trigger.

8. The computer program product of claim 7, wherein the trigger event is determined to have been met by querying a truth source.

9. The computer program product of claim 8, wherein the truth source comprises social networking feeds of the two or more individuals.

10. The computer program product of claim 9, wherein the truth source comprises social networking feeds of individuals who are connected to at least one of a sender and the recipient within the social networking system.

11. The computer program product of claim 8, wherein verifying that a trigger event has been met comprises verifying an occurrence of a trigger event in social networking feeds of the two or more individuals.

12. The computer program product of claim 5, wherein the release agent information is comprised of identifying a user within the social networking system, wherein the release agent may be enabled to release the capsuled digital data posthumously after death of a sender of the capsuled digital data.

13. The computer program product of claim 12, further comprising:
    receiving a release authorization from the release agent;
    notifying the sender that a release authorization has been received from the release agent, the notification comprising a cancellation election within a graphical user interface enabling the sender to cancel release of capsuled digital data;
    contacting the sender through a communications means outside of the social networking system if the sender has requested additional contact attempts, the contact enabling the sender to provide a cancellation election to cancel the release of capsuled digital data; and
    sending the capsuled digital data to the recipient if a cancellation election is not received from the sender within a pre-determined period of time.

14. An apparatus for delivering and displaying capsuled digital data, comprising:
    a memory; and
    at least one processor coupled to the memory and configured to:
        receive capsuled digital data, the capsuled digital data comprising recipient information, release agent information, digital data to display to a recipient, and trigger event information for digitally releasing the capsuled digital data to the recipient, the trigger event information comprising a trigger event that must be met in order to release the capsuled digital data to the recipient, and the digital data including one or more of an image or text that includes a plurality of words;
        generate a partially viewable version of the capsuled digital data responsive to sender preferences, the partially viewable version of the capsulated digital data including one or more of a blurred version of the image or a subset of the plurality of words in the text, the subset of the plurality of words being less than an entirety of the plurality of words;
        notify the recipient that a capsuled message has been created for the recipient, the notification comprising the trigger event information associated with the capsuled message;
        provide, in a graphical user interface, one or more of the blurred version of the image or the subset of the plurality of words in the text, the one or more of the blurred version of the image or the subset of the plurality of words in the text being available to the recipient until a trigger event is met;
        determine whether the trigger event is met, the determining based, at least in part, on a relationship-based release engine identifying a distance between two or more relationships in a social group;
        provide an updated partially viewable version of the capsuled digital data upon determining that the trigger event will be met; and
        provide the capsuled digital data to the recipient upon determining that the trigger event is met.

15. The apparatus of claim 14, wherein identifying the distance between the two or more relationships in the social group comprises generating a family tree of users within the social group.

16. The apparatus of claim 14, wherein the distance between the two or more relationships in the social group is defined, at least in part, by a relationship between two or more members of a family.

17. The apparatus of claim 14, wherein the social group is limited to family members of an individual who created the capsuled digital data.

18. The apparatus of claim 14, wherein the trigger event information is comprised of at least one of a calendar based trigger, an event based trigger, a condition based trigger, a location based trigger, and a release agent based trigger.

19. A computer-implemented method for delivering and displaying capsuled digital data, the computer-implemented method comprising:
    receiving capsuled digital data, the capsuled digital data comprising recipient information, release agent information, digital data to display to a recipient, and trigger event information for digitally releasing the capsuled digital data to the recipient, the trigger event information comprising a trigger event that must be met in order to release the capsuled digital data to the recipient, and the digital data including one or more of an image or text that includes a plurality of words;
    generating a partially viewable version of the capsuled digital data responsive to sender preferences, the partially viewable version of the capsulated digital data including one or more of a blurred version of the image or a subset of the plurality of words in the text, the subset of the plurality of words being less than an entirety of the plurality of words;
    notifying the recipient that a capsuled message has been created for the recipient, the notification comprising the trigger event information associated with the capsuled message;
    providing, in a graphical user interface, one or more of the blurred version of the image or the subset of the plurality of words in the text, the one or more of the blurred version of the image or the subset of the plurality of words in the text being available to the recipient until a trigger event is met;
    determining whether the trigger event is met, the determining based, at least in part, on a relationship-based release engine identifying a distance between two or more relationships in a social group;
    providing an updated partially viewable version of the capsuled digital data upon determining that the trigger event will be met; and
    providing the capsuled digital data to the recipient upon determining that the trigger event is met.

* * * * *